United States Patent Office 3,594,333
Patented July 20, 1971

3,594,333
FORMYLATED AROMATIC POLYMERS AND
METHOD OF MAKING SAME
David R. Buss, Kalamazoo, Mich., and Theodore
Vermeulen, Berkeley, Calif., assignors to The Regents
of the University of California
No Drawing. Filed July 26, 1967, Ser. No. 656,000
Int. Cl. C08f 27/00; C08j 1/30
U.S. Cl. 260—2.5                                18 Claims

ABSTRACT OF THE DISCLOSURE

Crosslinked, formylated, swellable aromatic-containing polymers prepared by swelling a preexisting crosslinked polymer with an inert organic solvent, reacting the polymer with a dihalomethyl alkyl ether in the presence of a mild Friedel-Crafts catalyst and hydrolyzing the reaction product. The resulting formylated polymer retains its swelling characteristics and is useful as an intermediate in the synthesis of optically active amine-containing sorbents.

---

This invention relates to an improved process for preparing formylated aromatic-containing polymers and to certain novel crosslinked, formylated swellable aromatic-containing polymers which are especially suitable as intermediates for reaction with amino acids in the synthesis of optically active amine-containing sorbents.

Although the direct formylation of various aromatic-containing monomers with dichloromethyl methyl ether has been reported, previous efforts to prepare formylated polymers have required exotic synthesis techniques. For example, a linear polyformylstyrene has been prepared by the reaction sequence of polystyrene to polyiodostyrene to polylithiumstyrene to poly(lithium-dimethylamino-methoxide styrene) to polyformylstyrene; see Makromolekulare Chemie 44/46, 269–280 (1961). Attempts to synthesize swellable formylated polymers from formylated monomers have not proven successful, as crosslinking also occurs at the formyl sites. This not only prevents further reaction at these sites, but produces a polymer containing excessive crosslinking. Furthermore, direct formylation of crosslinked aromatic polymers was not previously considered. The α-chloro-α-methoxymethyl group would be expected to crosslink the resin matrix to such an extent that swelling would be significantly impaired. The formyl groups would not be attached within the polymer beads and/or formyl sites would not be accessible for further reaction.

It has now been found that formylated aromatic polymers, exhibiting swelling characteristics that provide reactive sites for subsequent bonding of stereospecific centers thereto, can be prepared directly from preexisting crosslinked aromatic-containing polymers. This is accomplished by first swelling the desired polymer in a solvent such as methylene chloride. Thereafter the polymer is treated with a dihalomethyl alkyl ether such as α,α-dichloromethyl methyl ether in the presence of a Friedel-Crafts catalyst such as stannic chloride and hydrolyzed to produce the formylated aromatic polymer. It has been found that a single formyl group can be bonded to substantially all the aromatic rings in the polymer without producing a detrimental increase in the degree of crosslinking present. Certain formylated swellable copolymers, produced by the process herein described, constitute inventive subject matter in this application in addition to the process of formylating the aromatic-containing polymers.

The present invention is of particular value as the novel cross-linked, formylated, aromatic-containing polymers are especially suitable, because of their swelling characteristics, in the synthesis of optically active amine-containing sorbents by reaction with optically active amines such as amino acids (as set forth in greater detail in copending U.S. patent application, Ser. No. 656,077, filed concurrently herewith on July 26, 1967.

Although it is not intended for the invention to be limited to any specific theoretical concept, it appears that a Friedel-Crafts alkylation reaction occurs between the swellable aromatic-containing polymer, dihalomethyl alkyl ether, and Friedel-Crafts reagent producing a reaction product that can be easily hydrolyzed to provide the desired formylated copolymer. The addition of a α-chloro-α-methoxymethyl group, apparently at the para position, seems to chemically deactivate further alkylation of the aromatic rings.

The following reaction equations, depicting the use of α,α-dichloromethyl methyl ether, are thought to be representative:

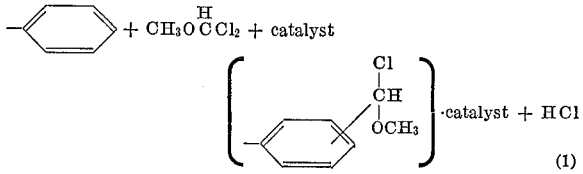

(1)

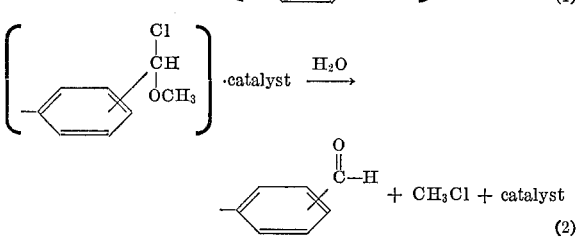

(2)

The present process is applicable to the formylation of any expandable, i.e., swellable or porous, crosslinked aromatic-containing polymer. This is meant to include crosslinked copolymers formed from an aryl-olefin, preferably carbocyclic, and an addition-polymerizable aryl diolefin, wherein each of the aryl groups contains from 6 to 12 carbon atoms. Of particular significance are those crosslinked copolymers having aryl groups containing 6 annular carbon atoms. Furthermore, it is preferred that the olefinic group be bonded directly to an annular carbon. Polymers having additional substituents such as amino, chloro, and aliphatic groups bonded to annular carbons are also useful in this invention provided that the side chains do not interfere or cause a detrimental effect on the formylation reaction.

The amount of crosslinking initially present in the polymer should be limited so that the resin matrix will possess at least minimum swelling characteristics. By this is meant that the matrix should expand to enable formylation to occur more or less uniformly throughout the polymer. In this regard, polymers containing up to about 13–14% crosslinking have been found to be suitable for formylation by the process of this invention. Where an intractable matrix is treated, formylation of the outer aromatic rings provides few if any useable formyl groups, unless the resin has been given a porous structure with large internal surface. For convenience of illustration, the following disclosure will be directed to a non-porous resin copolymer formed from styrene and about 4% divinylbenzene. This crosslinked copolymer, commercially available under the trademark Dowex, has been found to be especially suitable for formylation as described herein.

Solvents which have been found to be suitable for providing at least the minimum swelling of the polymer include but are not limited to methylene chloride, carbon tetrachloride, chloroform, carbon disulfide, nitrobenzene, nitromethane, nitroethane, and mixtures thereof. Furthermore dihalomethyl alkyl ethers, described infra, when employed in amounts in excess of that required to react with the polymer, may also provide the desired degree of swelling. The Friedel-Crafts alkylation catalysts which have been found to be advantageous are those that produce a mild reaction at standard conditions. However, stronger Friedel-Crafts catalyst may be employed where reaction conditions are maintained at lower temperatures. Those catalysts that are particularly advantageous include zinc chloride, titanium tetrachloride, stannic chloride, aluminum chloride, and the like.

Reactants which are suitable for the formylation of this invention include those dihalomethyl alkyl ethers which are defined by the following structural formula:

$$R\text{—}O\text{—}CHX_2$$

wherein R is an alkyl radical of from about 1–5 carbons, and the X's are each a halogen having an atomic number of 17, 35 or 53. The preferred dihalomethyl alkyl is $\alpha,\alpha$-dichloromethyl methyl ether.

In general, the process of this invention involves first subjecting the polymer to soaking with a solvent that produces a swelling of the crosslinked resin matrix. Solvent selection is particularly important as the polymer must expand sufficiently to allow penetration of the reagent throughout the polymer to ensure substantially complete formylation. Simultaneously therewith or subsequent to the addition of the solvent, the formylating reagent and Friedel-Crafts catalyst are added. As set forth above, the formylating reagent may be employed in excess in place of the solvent to provide at least the minimum degree of swelling desired. Upon completion of the alkylation reaction, the resulting reaction product is hydrolyzed to produce the desired formylated polymer.

It is of primary importance that the matrix be swollen so that the formylation may occur more or less uniformly throughout the crosslinked polymer. Therefore, the minimum amount of solvent required will be that which is sufficient to swell the polymer beads completely. Usually the solvent-to-ether ratio can be varied from about 3:1 to 12:1 without detrimentally affecting the reaction. A solvent-to-ether ratio of about 8:1 has been found to be particularly advantageous.

It is advantageous to employ stoichiometric amounts of resin, ether, and catalyst. However, to ensure a more complete formylation, the ether and catalyst may be utilized in modest excess, i.e. an amount such as 1.5–2.0 times that which is stoichiometrically required.

Although the process conditions are not critical to obtaining the desired formylated product, it will be apparent to those skilled in this art that the yield, i.e. extent of formylation, may be modified by varying the time, temperature, pressure, and amount of reagents. In addition, the size and shape of the individual copolymer beads may also affect the rate and uniformity of formylation.

To further illustrate the process of this invention, the following examples are provided. It should be understood that the details thereof are not to be regarded as limitations as they may be varied as will be understood by one skilled in this art.

EXAMPLE I

There were placed in a 250 ml. of flask containing a magnetic stirring bar for mixing, 23.0 grams (0.21 mole) of 150–200 mesh polystyrene beads containing 4% divinylbenzene. One hundred fifty ml. of methylene chloride was added as an inert solvent to swell the polymer, along with 25 ml. of stannic chloride (0.22 mole) as catalyst. Addition of 18.9 ml. of $\alpha,\alpha$-dichloromethyl methyl ether (0.21 mole) initiated the evolution of gaseous HCl, and the polymer gradually turned a deep blood-red color. Initially some cooling was applied to hold the mixture under 30° C. After one hour at atmospheric temperature and pressure, the reaction was stopped by cooling in an ice bath while gradually adding a 1:1 solution of dioxane and water, until no more heat was generated. The resulting mass wa grey-brown in color. The polymer beads were then filtered off, rinsed with a 5:4:1 solution of dioxane:water:12 N HCl, followed by dioxane, acetone, and methanol. Finally the product was air-dried on the filter for 12 hours with a yield of 27.0 g. and a concentration of 5.3 moles of formyl groups per gram of product. Under these conditions the styrene-divinylbenzene copolymer was converted to a formylated polymer to the extent of 67%. A longer reaction time of 2.5 hours produced 85% conversion. Still greater reaction times produced substantially 100% conversion.

EXAMPLE II

Portions of the product of Example I (85% formylated) were soaked in various solvents for lengthy periods of 25° C. The effect of the various solvents on swelling of the resin is shown in Table I, below. From these results and comparable data available for the swelling characteristics of untreated beads, it is apparent that little additional crosslinking was produced by the extensive formylation reaction.

TABLE I

| Solvent | Relative volume of wet beads to dry beads (25° C.) | |
|---|---|---|
| | Formylated | Untreated |
| $CHCl_3$ | 2.4 | 2.5 |
| $C_2H_4Cl_2$ | 2.4 | |
| Benzyl alcohol | 2.1 | |
| Dioxane | 2.1 | |
| Dimethyl formamide | 2.1 | |
| Acetone | 2.0 | 1.5 |
| Benzene-methanol (1:1) | 2.0 | |
| Benzene | 1.9 | 2.5 |
| Dimethyl sulfoxide | 1.7 | |
| Methanol [1] | 1.5 | 1.2 |
| i-Propanol [1] | 1.4 | |
| n-Propanol [1] | 1.4 | |
| Water [1] | 1.3 | |

[1] Measurements with these solvents were made on beads that were first swollen in $CHCl_3$. Using these solvents on dry beads did not give true readings, i.e. the matrix did not open up fully in reasonable length of time.

Although the foregoing invention has been described in some detail by way of illustration and example for purposes of clarity of understanding, it is understood that certain changes and modifications may be practiced within the spirit of the invention as limited only by the scope of the appended claims.

The invention described herein was made with the aid of United States Public Health Service funds.

What is claimed is:

1. A process for formylating an addition-polymer formed from up to 14% aryl diolefin with the remainder being aryl mono-olefin, wherein each aryl group contains from 6 to 12 carbon atoms, comprising the steps of: expanding said addition-polymer; reacting the expanded addition-polymer with a Friedel-Crafts catalyst and a dihalomethyl alkyl ether of the formula:

$$R\text{—}O\text{—}CHX_2$$

wherein R is an alkyl radical of from about 1–5 carbons, and each X is a halogen having an atomic number of 17–53, inclusive; and thereafter hydrolyzing said reaction product to produce said formylated polymer.

2. A process in accordance with claim 1 wherein the reaction is accomplished in the presence of an inert organic solvent in an amount sufficient to cause said expansion in said polymer so that said dihalomethyl alkyl ether will react substantially uniformly throughout said polymer.

3. A process in accordance with claim 1 wherein the amount of said ether employed is in excess of that required to react with said polymer, said excess amount being sufficient to cause said expansion in said polymer so that said ether will react uniformly throughout said polymer.

4. A process in accordance with claim 1 wherein R is a methyl radical and each X is a chlorine atom.

5. A process in accordance with claim 1 wherein said catalyst is selected from stannic chloride, zinc chloride, titanium tetrachloride and aluminum chloride.

6. A process in accordance with claim 5 wherein said catalyst is stannic chloride.

7. A process in accordance with claim 2 wherein said solvent is selected from methylene chloride, carbon tetrachloride, chloroform, carbon disulfide, nitrobenzene, nitromethane, nitroethane, and dihalomethyl alkyl ethers.

8. A process in accordance with claim 7 wherein said solvent is methylene chloride.

9. A process in accordance with claim 1 wherein said aromatic-containing polymer is formed from an aryl-olefin cross-linked with an addition-polymerizable aryl-diolefin, wherein the aryl groups contain from 6-12 carbons.

10. A process in accordance with claim 9 wherein said aromatic-containing polymer is formed from styrene cross-linked with divinyl benzene.

11. A formylated copolymer containing an aryl-olefin having aryl groups of from 6-12 carbons cross-linked with an addition-polymerizable aryl-diolefin having aryl groups of from 6-12 carbons, said copolymer being free of significant cross-linking at the formyl sites and having swelling characteristics substantially similar to the swelling characteristics of the cross-linked copolymer prior to formylation.

12. A formylated copolymer as described in claim 11 wherein the aryl groups contain 6 carbons.

13. A formylated copolymer as described in claim 11 wherein said aryl-diolefin is present as up to 14% by weight of the total copolymer.

14. A formylated copolymer as described in claim 11 wherein each olefin is a vinyl group.

15. A formylated copolymer as described in claim 11 wherein said aryl-olefin is styrene and said addition-polymerizable aryl-diolefin is divinyl benzene.

16. A swellable cross-linked copolymer of an aryl-olefin having aryl groups of from 6-12 carbons and an addition-polymerizable aryl-diolefin having aryl groups of from 6-12 carbons wherein a majority of said aryl groups are formylated, said copolymer being free of significant cross-linking at the formyl sites.

17. A swellable crosslinked copolymer as described in claim 16 wherein said formylation is at the para position.

18. A swellable crosslinked copolymer as described in claim 16 wherein at least 67% of the aryl groups are formylated.

References Cited

UNITED STATES PATENTS

| | | | |
|---|---|---|---|
| 3,008,927 | 11/1961 | Seifert | 260—73 |
| 3,297,648 | 1/1967 | Corte et al. | 260—73 |
| 3,425,990 | 2/1969 | Corte et al. | 260—73 |

OTHER REFERENCES

Makro Molekulare Chemie 44/46, pp. 269-280 (1961).

MURRAY TILLMAN, Primary Examiner

M. FOELAK, Assistant Examiner

U.S. Cl. X.R.

260—30.8, 32.4, 33.8, 73, 88.2